(12) United States Patent
Kim et al.

(10) Patent No.: US 9,093,719 B2
(45) Date of Patent: *Jul. 28, 2015

(54) NON-AQUEOUS ELECTROLYTE AND ELECTROCHEMICAL DEVICE WITH AN IMPROVED SAFETY

(75) Inventors: Young-Soo Kim, Daejeon (KR); Soon-Ho Ahn, Daejeon (KR); Soo-Hyun Ha, Daejeon (KR)

(73) Assignee: LG Chem, Ltd. (KR)

( * ) Notice: Subject to any disclaimer, the term of this patent is extended or adjusted under 35 U.S.C. 154(b) by 733 days.

This patent is subject to a terminal disclaimer.

(21) Appl. No.: 13/363,632

(22) Filed: Feb. 1, 2012

(65) Prior Publication Data

US 2012/0129053 A1 May 24, 2012

Related U.S. Application Data

(62) Division of application No. 12/223,950, filed as application No. PCT/KR2007/000809 on Feb. 15, 2007, now abandoned.

(30) Foreign Application Priority Data

Feb. 15, 2006 (KR) .................. 10-2006-0014640

(51) Int. Cl.
*H01M 10/0567* (2010.01)
*H01M 10/0569* (2010.01)
*H01M 10/058* (2010.01)

(52) U.S. Cl.
CPC ........ *H01M 10/0567* (2013.01); *H01M 10/058* (2013.01); *H01M 10/0569* (2013.01); *H01M 2300/0025* (2013.01); *H01M 2300/0028* (2013.01); *H01M 2300/0037* (2013.01); *Y02E 60/122* (2013.01)

(58) Field of Classification Search
CPC ............... H01M 10/0567; H01M 10/0569; H01M 2300/0028; H01M 2300/0037; H01M 10/058; H01M 2300/0025; Y02E 60/122
USPC .................. 429/307, 326, 330, 331, 332
See application file for complete search history.

(56) References Cited

U.S. PATENT DOCUMENTS

| | | | |
|---|---|---|---|
| 5,589,295 A | 12/1996 | Derzon et al. | |
| 6,743,947 B1 | 6/2004 | Xu et al. | |
| 7,776,475 B2 | 8/2010 | Shimizu et al. | |
| 2004/0076887 A1 | 4/2004 | Panitz et al. | |
| 2004/0197667 A1 | 10/2004 | Noh et al. | |
| 2005/0031963 A1 | 2/2005 | Im et al. | |
| 2005/0084765 A1 | 4/2005 | Lee et al. | |
| 2005/0208371 A1 | 9/2005 | Kim et al. | |
| 2006/0024577 A1 | 2/2006 | Schwake | |
| 2006/0035144 A1 | 2/2006 | Shinizu et al. | |
| 2006/0194118 A1 | 8/2006 | Yew et al. | |
| 2006/0204834 A1 | 9/2006 | Kim et al. | |

FOREIGN PATENT DOCUMENTS

| | | |
|---|---|---|
| CN | 1487621 A | 4/2004 |
| CN | 1612405 A | 5/2005 |
| CN | 1650466 A | 8/2005 |
| EP | 1150374 A1 | 10/2001 |
| EP | 1463143 A2 | 9/2004 |
| EP | 1508934 A1 | 2/2005 |
| EP | 1696501 A1 | 8/2006 |
| JP | 2004179146 A | 6/2004 |
| JP | 2005072003 A | 3/2005 |
| JP | 2005521257 A | 7/2005 |
| JP | 2006073513 A | 3/2006 |
| JP | 2006245001 A | 9/2006 |
| KR | 10-2005-0075297 A | 7/2005 |
| KR | 10-2005-0078443 A | 8/2005 |
| KR | 20050089246 A | 9/2005 |
| KR | 10-2006-0044919 | 5/2006 |
| WO | 9735332 A1 | 9/1997 |
| WO | 9815024 A1 | 4/1998 |
| WO | 03075371 A2 | 9/2003 |
| WO | 2005069423 A1 | 7/2005 |

OTHER PUBLICATIONS

McMillan R et al: "Fluoroethylene carbonate electrolyte and its use in lithium ion batteries with graphite anodes" Journal of Power Sources, Elsevier SA, CH LNKD-DOI:10.1016/S0378-7753(98)00201-8, vol. 81-82, Sep. 1, 1999, pp. 20-26, XP004363118 ISSN: 0378-7753.
Smart M C et al: "Improved performance of lithium-ion cells with the use of fluorinated carbonate-based electrolytes" Journal of Power Sources, Elsevier SA, CH LNKD-DOI:10.1016/S0378-7753(03)00266-0, vol. 119-121, Jun. 1, 2003, pp. 359-367, XP004430195 ISSN: 0378-7753.
Kang Xu et al: "Evaluation of Fluorinated Alkyl Phosphates as Flame Retardants in Electrolytes for Li-Ion Batteries II. Performance in Cell" Journal of the Electrochemical Society, Electrochemical Society. Manchester, New Hampshire, US LNKD-DOI:10.1149/1.1533041, vol. 150, No. 2, Jan. 1, 2003, pp. A170-A175, XP007906704 ISSN: 0013-4651.
Supplementary European Search Report, EP 07708959, dated Apr. 28, 2010.
Office Action from corrresponding Chinese Application No. 200780005439, dated Apr. 12, 2010.
Office Action from corrresponding Chinese Application No. 200780005429.8, dated Jun. 13, 2010.
Office Action from corresponding Taiwanese Patent Application No. 96105471 dated Sep. 23, 2010.
Office Action from corresponding Taiwanese Patent Application No. 96105473 dated Sep. 23, 2010.

*Primary Examiner* — Laura Weiner
(74) *Attorney, Agent, or Firm* — Lerner, David, Littenberg, Krumholz & Mentlik, LLP

(57) ABSTRACT

Disclosed is an electrochemical device comprising a cathode having a complex formed between a surface of a cathode active material and an aliphatic di-nitrile compound; and a non-aqueous electrolyte containing 1-10 wt % of a compound of Formula 1 or its decomposition product based on the weight of the electrolyte.

12 Claims, 2 Drawing Sheets

NON-AQUEOUS ELECTROLYTE AND ELECTROCHEMICAL DEVICE WITH AN IMPROVED SAFETY

CROSS-REFERENCE TO RELATED APPLICATIONS

The present application is a divisional of U.S. patent application Ser. No. 12/223,950 filed on Aug. 12, 2008, now abandoned, which is a national phase entry under 35 U.S.C. §371 of International Application No. PCT/KR2007/000809, filed Feb. 15, 2007, published in English, which claims priority from Korean Patent Application No. 10-2006-0014640, filed Feb. 15, 2006. The disclosures of said applications are incorporated by reference herein.

TECHNICAL FIELD

The present invention relates to a non-aqueous electrolyte having improved safety and to an electrochemical device comprising the same.

BACKGROUND ART

Recently, as electronic instruments have become wireless and portable, non-aqueous electrolyte-based secondary batteries with high capacity and high energy density have been practically used as drive sources for the electronic instruments. A lithium secondary battery, which is a typical example of the non-aqueous secondary batteries, comprises a cathode, an anode and an electrolyte and is chargeable and dischargeable because lithium ions coming out from a cathode active material during a charge process are intercalated into an anode active material and deintercalated during a discharge process, so that the lithium ions run between both the electrodes while serving to transfer energy. Such a high-capacity lithium secondary battery has an advantage in that it can be used for a long period of time due to high energy density. However, the lithium secondary battery has problems in that when the battery is exposed to high temperatures for a long period of time due to internal heat generation during the driving thereof, the stable structure of the battery, comprising a cathode (ex. lithium transition metal oxide), an anode (ex. crystalline or non-crystalline carbon) and a separator, will be changed due to gas generation caused by the oxidation of the electrolyte to deteriorate the performance of the battery or, in severe cases, to cause the ignition and explosion of the battery due to internal short circuits in severe cases.

To solve such problems, there have been many recent attempts to improve the high-temperature safety of the battery by (1) using a porous polyolefin-based separator having a high melting point, which does not easily melt in the internal/external thermal environments or (2) adding a non-flammable organic solvent to a non-aqueous electrolyte comprising a lithium salt and a flammable organic solvent.

However, the polyolefin-based separator has a disadvantage in that it should generally have high film thickness in order to achieve high-melting point and to prevent internal short circuits. This high film thickness relatively reduces the loading amount of the cathode and the anode, thus making it impossible to realize a high capacity of the battery, or deteriorating the performance of the battery in severe cases. Also, the polyolefin-based separator consists of a polymer such as PE or PP, which has a melting point of about 150° C., and thus, when the battery is exposed to high temperatures above 150° C. for a long period of time, the separator will melt, causing short circuits inside the battery, thus causing the ignition and explosion of the battery.

Meanwhile, a lithium secondary battery comprising a flammable non-aqueous electrolyte containing a lithium salt, cyclic carbonate and linear carbonate has the following problems at high temperatures: (1) a large amount of heat is generated due to the reaction between lithium transition metal oxide and the carbonate solvent to cause the short circuit and ignition of the battery, and (2) a thermally stable battery cannot be realized due to the flammability of the non-aqueous electrolyte itself.

Recently, efforts to solve the problems associated with the flammability of the electrolyte by adding a phosphorus (P)-based compound having flame retardancy have been made, but the compound causes a problem of accelerating irreversible reactions, including Li corrosion, in a battery, thus significantly reducing the performance and efficiency of the battery.

DISCLOSURE OF THE INVENTION

The present inventors have found that when both a fluoroethylene carbonate (FEC) compound and an aliphatic di-nitrile compound are used as electrolyte additive, these compounds show a synergic effect in terms of the performance of a battery, as well as in terms of the safety of the battery, for example in terms of the prevention of battery ignition at over-charged state and/or the prevention of ignition/explosion caused by internal short circuit of a battery at high temperatures above 150° C. The present invention is based on this finding.

The present invention provides a non-aqueous electrolyte comprising a lithium salt and a solvent, the electrolyte containing, based on the weight of the electrolyte, 1-10 wt % of a compound of Formula 1 or its decomposition product, and 1-10 wt % of an aliphatic di-nitrile compound, as well as an electrochemical device comprising the non-aqueous electrolyte:

[Formula 1]

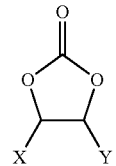

wherein X and Y are each independently hydrogen, chlorine or fluorine, except that both X and Y are not hydrogen.

In another aspect, the present invention provides an electrochemical device comprising: a cathode having a complex formed between a surface of a cathode active material and an aliphatic di-nitrile compound; and a non-aqueous electrolyte containing 1-10 wt % of a compound of Formula 1 or its decomposition product based on the weight of the electrolyte.

In the present invention, the aliphatic di-nitrile compound is preferably succinonitrile.

Moreover, in the present invention, the decomposition product of the compound of Formula 1 has an opened-ring structure.

BRIEF DESCRIPTION OF THE DRAWINGS

FIG. 1 is for Example 1, FIG. 2 for Comparative Example 1, FIG. 3 for Comparative Example 2.

Hereinafter, the present invention will be described in detail.

Figure 1:
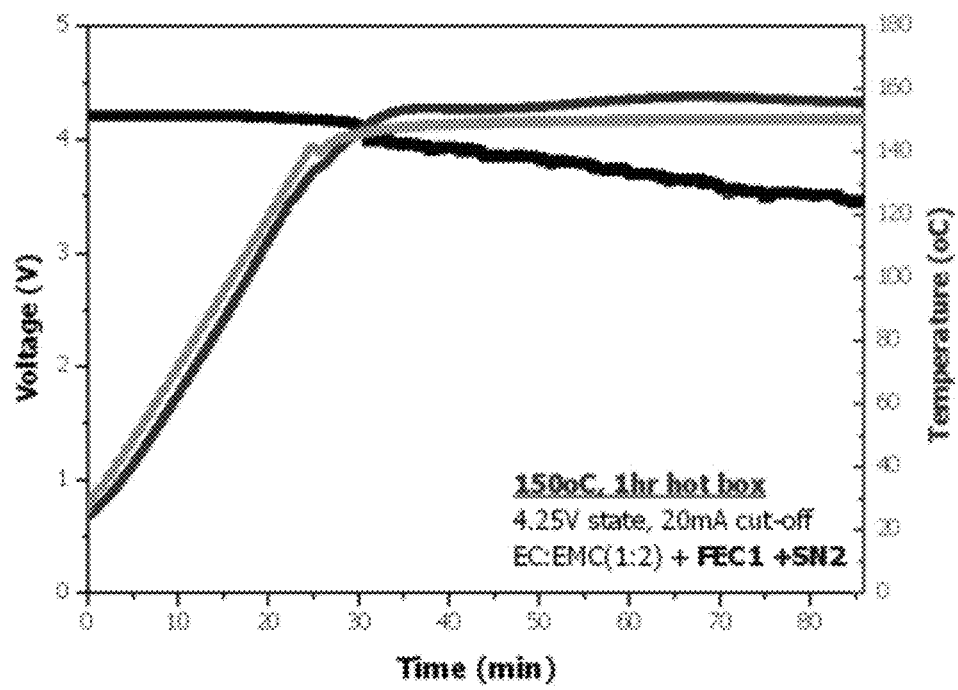
FIGS. 1 to 3 are graphic diagrams showing whether the ignition and explosion of batteries occur after the batteries are stored in an oven at 150° C. in a state in which the batteries are charged to 4.2V. Herein.
Figure 2:
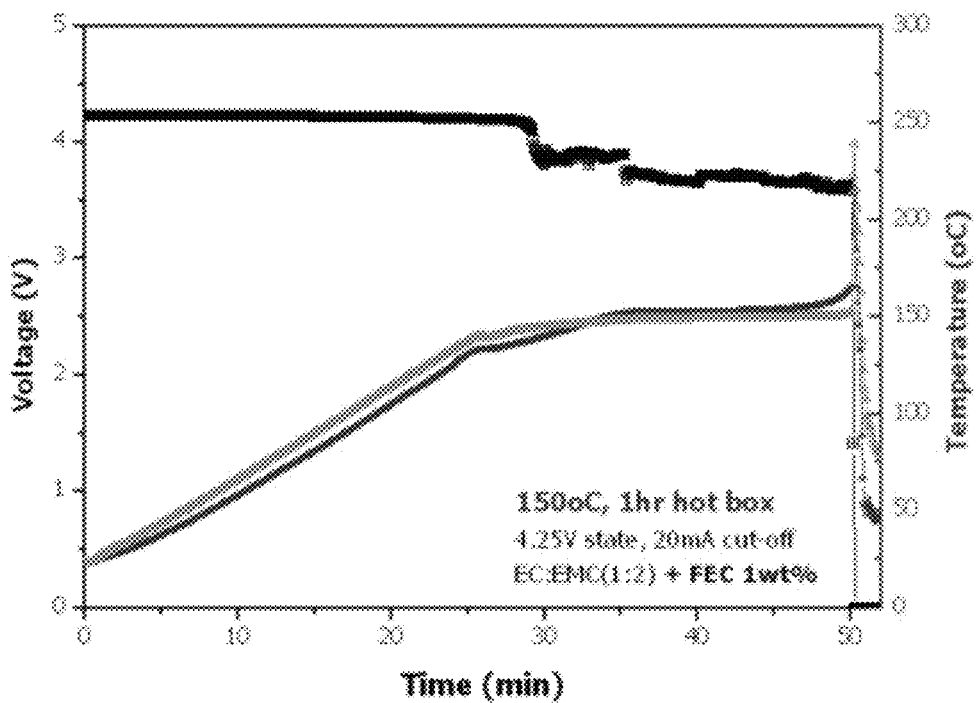
Figure 3:
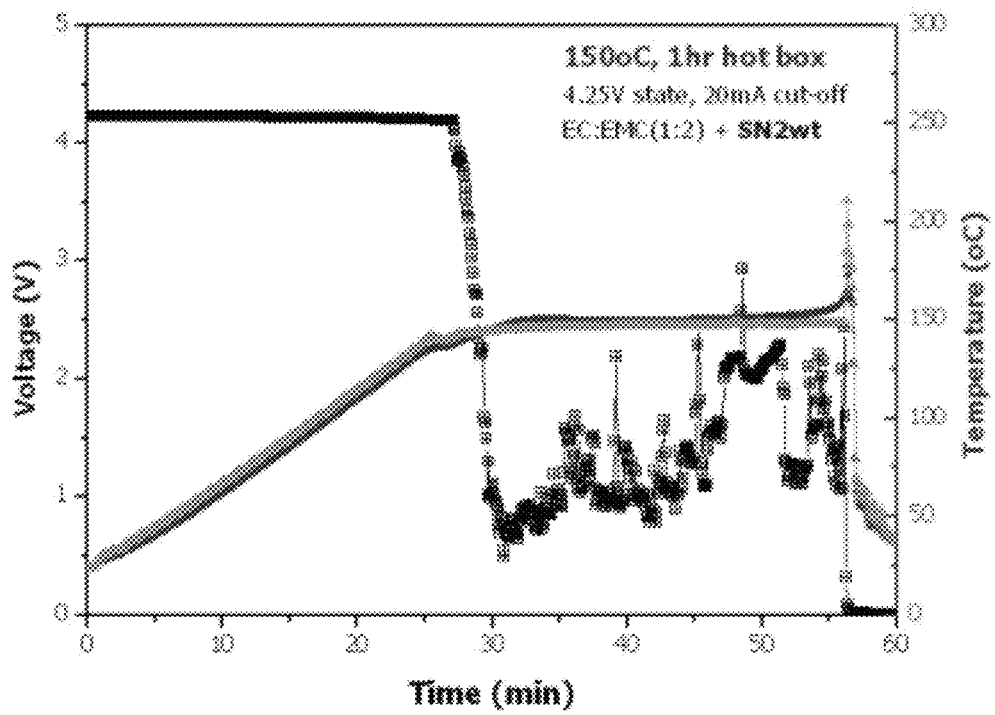

The present inventors have found through experiments that the compound of Formula 1 and a nitrile compound having a cyano (—CN) functional group show a synergic effect in terms of securing battery safety associated with thermal shock and in terms of high-temperature cycle life (see FIGS. 1 to 3).

When the compound of Formula 1 or its decomposition product and the aliphatic di-nitrile compound are used in combination as additive, they can show a synergic effect in terms of the safety of a battery, and the mechanism thereof is as follows.

The ignition and explosion reactions of a lithium ion battery can occur due to a rapid exothermic reaction between a charged cathode and an electrolyte, and if the capacity of the battery increases, only controlling the exothermic reaction between the cathode and the electrolyte cannot secure the safety of the battery.

Generally, when the charge voltage of the cathode is high or the capacity of the battery is increased (an increase in the number of stacks (pouch type batteries, etc.) or the number of electrode windings of jelly-rolls (cylindrical or prismatic batteries, etc.)), the energy level of the battery will be increased, and thus the battery will tend to generate heat due to physical shock (e.g., heat, temperature, pressure, etc.), or in severe cases, explode, thus reducing the safety of the battery.

The compound of Formula 1 such as a fluoroethylene carbonate can prevent or delay the battery from being ignited by the exothermic reaction, compared to ethylene carbonate. This is because the compound of Formula 1 consists of a halogen-based compound (e.g., one introduced with at least one of fluorine (F) and chlorine (Cl)) having a high flame-retardant effect, and in particular, the compound can form an SEI layer (protective layer) on the anode surface upon charge to delay micro- or macro-thermal short circuits occurring inside the battery.

However, the compound of Formula 1 such as a fluoroethylene carbonate is so thermally fragile to be easily decomposed at high temperature and to generate a large amount of gas. The generated gas can vent a pouch-typed or can-typed battery case, thereby accelerating the combustion of the electrolyte and causing the ignition and explosion of the battery due to internal short circuits That is, when the compound of Formula 1 or its decomposition product is used alone, the safety of the battery, particularly the high-temperature safety of the battery, cannot be sufficiently secured (see FIG. 2). Accordingly, the present invention is characterized in that the aliphatic di-nitrile compound is used in combination with the compound of Formula 1 or its decomposition product.

When the aliphatic di-nitrile compound is used in combination with the compound of Formula 1 or its decomposition product, the aliphatic di-nitrile compound can form a complex on the surface of a cathode consisting of lithium-transition metal oxide so as to inhibit the reaction between the electrolyte (ex. linear carbonates or cyclic carbonates) and the cathode, thus controlling heat generation and controlling an increase in the temperature of the battery. Also, the complex formation can prevent the combustion of the electrolyte, which is accelerated by oxygen liberated due to the structural collapse of the cathode, prevent thermal runaway phenomena, and prevent the internal short circuit of the battery from occurring due to heat generation (see FIG. 4).

Also, the continuous interaction chemically between the compound of Formula 1 and the cyano (—CN) functional group of the nitrile compound prevents a large amount of gas generation occurred when using the compound of Formula 1 alone.

In short, 1) the compound of Formula 1 or its decomposition product and 2) an aliphatic di-nitrile compound such as succinonitrile can show a synergic effect, thus improving the safety of the battery.

Furthermore, when the compound of Formula 1 or its decomposition product and the aliphatic di-nitrile compound are used in combination, they can show a synergic effect in terms of the performance of a battery, and the mechanism thereof is as follows.

The compound of Formula 1 or its decomposition product forms a dense and close passivation layer on the anode upon the initial charge cycle (which is generally referred as formation of a battery). The passivation layer prevents co-intercalation of the carbonate solvent into the layered structure of active materials and decomposition of the carbonate solvent, and thus reduces irreversible reactions in the battery. Additionally, the passivation layer allows only $Li^+$ to be intercalated/deintercalated through the layer, thereby improving the life characteristics of the battery.

However, the passivation layer (SEI layer) formed by the compound is easily decomposed at high temperature (above 60° C.) to generate a large amount of gas ($CO_2$ and CO), and particularly in the case of a cylindrical battery, the generated gas breaks a current interruptive device (CID), an electrochemical device at a cylindrical cap region, to interrupt electric current, thus reducing the function of the battery. In severe cases, the generated gas opens the cap region, so that the electrolyte leaks to corrode the appearance of the battery or to cause a significant reduction in the performance of the battery.

According to the present invention, gas generation resulting from the compound of Formula 1 or its decomposition product can be inhibited through the use of the aliphatic di-nitrile compound by the chemical interaction between the compound of Formula 1 or its decomposition and a cyano (—CN) functional group, thus improving the high-temperature cycle life characteristics of the battery (see Table 2).

When considering this effect together with an improvement in the performance of a high-capacity battery, succinonitrile is most suitable as aliphatic di-nitrile.

Among aliphatic di-nitrile compounds, those having long chain length have no great effect on the performance and safety of the battery or adversely affect the performance of the battery, and thus those having short chain length are preferable. However, malononitrile ($CN-CH_2-CN$) having an excessively short chain length causes side reactions such as gas generation in the battery, and thus it is preferable to use those having 2-12 aliphatic hydrocarbons ($CN-(CH_2)_n-CN$, n=2-12), including succinonitrile. Among them, it is more preferable to select nitrile having small carbon number. Most preferred is succinonitrile.

Meanwhile, among compounds containing a cyano functional group, aromatic nitriles and fluorinated aromatic nitrile compounds are not preferable because they are electrochemically easily decomposed in the battery to interfere with the migration of Li ions, thus deteriorating the performance of the battery.

The content of the compound of Formula 1 or its decomposition product for use in the inventive electrolyte is preferably 1-10 wt %, and more preferably 1-5 wt %. The compound of Formula 1 has a high viscosity, and thus when the compound of Formula 1 is used in an excessive amount, the ion conductivity of the electrolyte can be reduced and the mobility of Li ion can be inhibited, causing to a reduction of the cycle life and capacity of battery.

The content of the aliphatic di-nitrile compound is preferably 1-10 wt %, more preferably 1-5 wt %, and most preferably 1-3 wt %, in view of the performance of the electrolyte.

The inventive electrolyte may contain as an additive an aliphatic mono-nitrile compound having one cyano (—CN) functional group such as R—CN, wherein R is aliphatic hydrocarbon etc.).

The inventive non-aqueous electrolyte for lithium secondary batteries contain a general non-aqueous organic solvents, including cyclic carbonates, linear carbonates and combinations thereof. Typical examples of the cyclic carbonates include ethylene carbonate (EC), propylene carbonate (PC), gamma-butyrolactone (GBL) and the like, and typical examples of the linear carbonates include diethyl carbonate (DEC), dimethyl carbonate (DMC), ethylmethyl carbonate (EMC) and the like.

The non-aqueous electrolyte contains a lithium salt, non-limiting examples of which include $LiClO_4$, $LiCF_3SO_3$, $LiPF_6$, $LiBF_4$, $LiAsF_6$, $LiSbF_6$, $LiN(CF_3SO_2)_2$, $LiN(C_2F_6SO_2)_2$, $LiAlSO_4$, $LiAlCl_4$, $LiSO_3CF_3$, and $LiN(C_xF_{2x+1}SO_2)(C_yF_{2y+1}SO_2)$ (x and y=natural numbers).

Meanwhile, the aliphatic di-nitrile compounds can form a bond with a transition metal, such as cobalt, contained in the cathode active material through their cyano functional groups having high dipole moment. Particularly, the cyano functional groups can form stronger bonds with the surface of the cathode at high temperature, thereby forming a complex structure.

In order to simplify a manufacturing process of a battery, it is preferable that the aliphatic di-nitrile compound is introduced into an electrolyte, and then a complex is formed between the surface of a cathode active material and the aliphatic di-nitrile compound. However, it is also possible to separately prepare a cathode having a complex formed on the surface thereof, before the assemblage of a battery.

Preferably, the complex between the surface of a cathode active material and the aliphatic di-nitrile compound is formed by dipping a cathode, comprising a cathode active material coated on a collector, into an electrolyte containing the aliphatic di-nitrile compound added thereto, followed by heat treatment at high temperature. The high-temperature heat treatment may be performed in such a temperature range as not to affect electrode active materials and a binder, generally at a temperature of 180° C. or lower. Otherwise, although the high-temperature heat treatment depends on the kind of the aliphatic di-nitrile compound, it may be performed at such a temperature range as to prevent excessive evaporation of the aliphatic di-nitrile compound, generally at a temperature of 100° C. or lower. In general, the high-temperature treatment is suitably performed at a temperature between 60° C. and 90° C. Long-term treatment at a temperature between 30° C. and 40° C. may provide the same effect.

In addition, in the present invention, a compound capable of forming a passivation layer on the surface of an anode may additionally be used to prevent side reactions where a passivation layer formed on the anode from the compound of Formula 1, such as fluoroethylene carbonate, emits a large amount of gas at high temperature. Non-limiting examples of the compound include alkylene compounds, such as vinylene carbonate (VC), sulfur-containing compounds, such as propane sulfone, ethylene sulfite and 1,3-propane sultone, and lactam-based compounds, such as N-acetyl lactam.

Furthermore, the electrolyte according to the present invention may comprise vinylene carbonate, propane sulfone and ethylene sulfite at the same time, but only a sulfur-containing compound may also be selectively added to the electrolyte to improve the high-temperature cycle life characteristics of the battery.

A typical example of electrochemical devices, which can be manufactured according to the present invention, is a lithium secondary battery, which may comprise: (1) a cathode capable of intercalating and deintercalating lithium ions; (2) an anode capable of intercalating and deintercalating lithium ions; (3) a porous separator; and (4) a) a lithium salt, and b) an electrolyte solvent.

In general, as a cathode active material for use in a lithium secondary battery, lithium-containing transition metal oxides may be used. The cathode active material can be at least one material selected from the group consisting of $LiCoO_2$, $LiNiO_2$, $LiMn_2O_4$, $LiMnO_2$, and $LiNi_{1-x}Co_xM_yO_2$ (wherein $0 \leq X \leq 1$, $0 \leq Y \leq 1$, $0 \leq X \leq 1$, M is a metal such as Mg, Al, Sr or La). Meanwhile, as an anode active material for use a lithium secondary battery, carbon, lithium metal or lithium alloy may be used. In addition, other metal oxides capable of lithium intercalation/deintercalation and having an electric potential of less than 2V based on lithium (for example, $TiO_2$ and $SnO_2$) may be used as the anode active material.

The lithium secondary battery according to the present invention may have a cylindrical, prismatic or pouch-like shape.

Hereinafter, the present invention will be described in further detail with reference to examples. It is to be understood, however, that these examples are illustrative only and the present invention is not limited thereto.

EXAMPLES

Example 1

An electrolyte used in this Example was a 1M $LiPF_6$ solution having a composition of EC:EMC=1:2. To the electrolyte, 1 wt % of fluoroethylene carbonate and 2 wt % of succinonitrile were added. Artificial graphite and $LiCoO_2$ were used as an anode active material and a cathode active material, respectively. Then, a 3443 size of lithium polymer battery was manufactured according to a conventional method and aluminum laminate was used as the battery package.

Example 2

A lithium polymer battery was manufactured in the same manner as in Example 1, except that 3 wt % of fluoroethylene carbonate was used instead of 1 wt % of fluoroethylene carbonate.

Example 3

A lithium polymer battery was manufactured in the same manner as in Example 1, except that 5 wt % of fluoroethylene carbonate was used instead of 1 wt % of fluoroethylene carbonate.

Comparative Example 1

A lithium polymer battery was manufactured in the same manner as in Example 1, except that 1 wt % of fluoroethylene carbonate was added and succinonitrile was not added.

Comparative Example 2

A lithium polymer battery was manufactured in the same manner as in Example 1, except that 2 wt % of succinonitrile was added and fluoroethylene carbonate was not added.

Comparative Example 3

A lithium polymer battery was manufactured in the same manner as in Comparative Example 1, except that 3 wt % of fluoroethylene carbonate was used.

Comparative Example 4

A lithium polymer battery was manufactured in the same manner as in Example 1, except that fluoroethylene carbonate and succinonitrile were not added.

Comparative Example 5

A lithium polymer battery was manufactured in the same manner as in Comparative Example 1, except that 5 wt % of fluoroethylene carbonate was used.

Comparative Example 6

A lithium polymer battery was manufactured in the same manner as in Comparative Example 2, except that 5 wt % of butyronitrile was used instead of succinonitrile.

Experiment

1. Test for Safety (1)

Each of the batteries manufactured in Example 1 and Comparative Examples 1 and 2 was charged to 4.25V and stored in an oven at 150° C., and then whether the ignition and explosion of the batteries occurred was observed. The observation results are shown in FIGS. 1 to 3.

As can be seen in FIG. 1, only the case of the battery containing 1 wt % of fluoroethylene carbonate (FEC) and 2 wt % of the succinonitrile compound (SN) added to the electrolyte solvent realized a thermally stable battery at high temperature for 1 hour or longer without ignition.

On the other hand, in the case of adding fluoroethylene carbonate alone (FIG. 2) or the case of adding only succinonitrile (FIG. 3), it could be seen that the battery was ignited and exploded at a high temperature above 150° C. without maintaining high-temperature safety for 1 hour. However, the battery comprising the electrolyte containing only succinonitrile added thereto had an advantage in that the time for the battery to explode was long because the battery was superior to the battery comprising the electrolyte containing fluoroethylene carbonate alone with respect to controlling heat generation resulting from the reaction between the cathode and the electrolyte and the structural collapse of the cathode.

2. Test for Safety (2)

Each of the batteries manufactured in Example 1 and Comparative Example 4 was charged to 4.2V. A general thermogravimetric analyzer, DSC (Differential Scanning calorimeter), was used, wherein two high-pressure pans capable of resisting the vapor pressure of the electrolyte were used as pans for measurement. To one pan, about 5-10 mg of the cathode sample separated from each of the batteries charged to 4.2V was introduced, while the other pan was left empty. The calorific difference between the two pans was analyzed while the pans were heated at a rate of 5° C./min to 400° C. to measure temperature peaks corresponding to heat generation.

Figure 4:
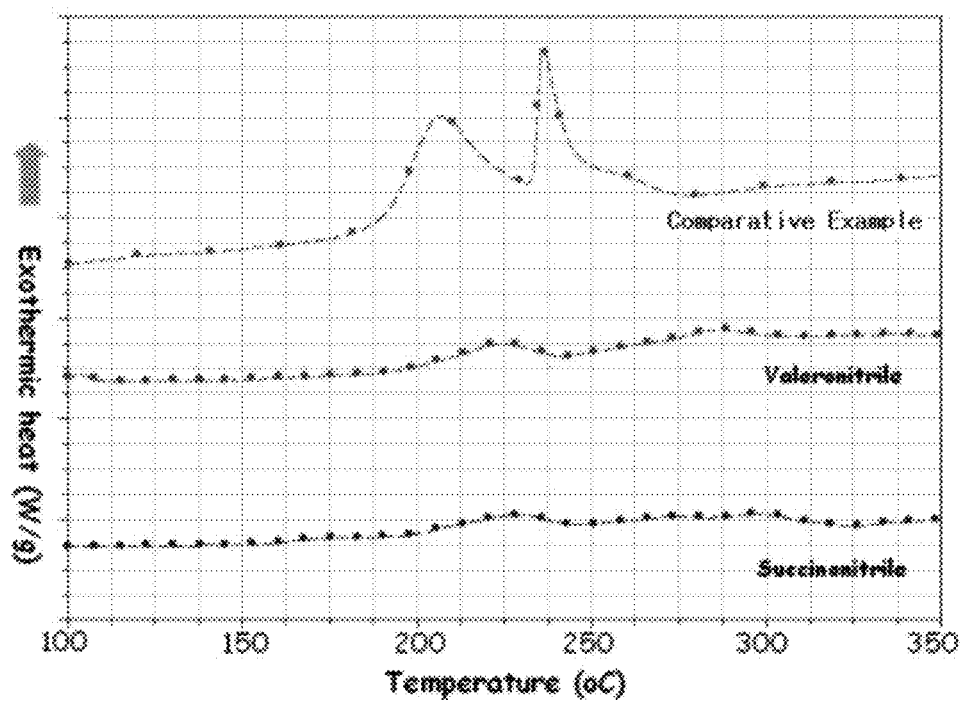
FIG. 4 is a graphic diagram showing the results of heat generation analysis conducted using differential scanning calorimetry (DSC) in order to examine the thermal safety of each of the batteries manufactured in Example 1 and Comparative Example 1.

As shown in FIG. 4, the battery (Comparative Example 4) manufactured without the aliphatic di-nitrile compound shows heat generation peaks at about 200° C. and about 240° C. Generally, the peak at about 200° C. indicates heat generation caused by the reaction between the electrolyte and the cathode, while the peak at about 240° C. indicates heat generation caused by combined factors including the reaction between the electrolyte and the cathode, and the structural collapse of the cathode. The battery comprising the non-aqueous electrolyte containing succinonitrile added thereto showed a remarkable reduction in heat generation without showing the above two temperature peaks. This indicates that heat generation caused by the reaction between the electrolyte and the cathode was controlled due to the formation of a protective layer through a strong bond between succinonitrile and the cathode surface.

3. Test for Safety (3)

Each battery obtained from Examples 1 and 2, and Comparative Examples 1, 2, 3, 4 and 6 was tested under the overcharge conditions of 12V/1C and 20V/1C in a CC/CV (Constant Current/Constant Voltage) manner. The above overcharge test was repeated many times and the average values for the test results are shown in the Table 1.

As shown in Table 1, only the case of the battery containing fluoroethylene carbonate and succinonitrile compound added to the electrolyte solvent showed a excellent safety without ignition nor internal short circuits, by controlling the oxidation of the electrolyte and the exothermic reaction resulting from the structural collapse of the cathode.

On the other hand, in the case of adding fluoroethylene carbonate alone such as Comparative Example 1 and 3 or the case of adding only aliphatic mono-nitrile compound or the aliphatic di-nitrile compound such as Comparative Example 2 and 6, it could be seen that the frequency of the battery ignition at over-charged state is not constant and is largely high. For example, batteries were ignited while a high temperature above 200° C. was detected inside the battery/at surface of the battery.

Meanwhile, the case of adding neither aliphatic mono-nitrile compound nor the aliphatic di-nitrile compound (Comparative Example 4), all the batteries were ignited.

TABLE 1

| Electrolyte = EC:EMC(1:2 vol. %) base, High loading electrode | | | | | | |
|---|---|---|---|---|---|---|
| Safety: Overcharge | FEC1 + SN2 | FEC3 + SN2 | *FEC1 | FEC3 | **SN2 | ***BN5 |
| 12 V 1 C | Safe | Safe | Fire | Fire | Fire | Fire |
| 20 V 1 C | Safe | Safe | Fire | Fire | Fire | Fire |

*FEC = Fluoro Ethylene carbonate
**SN = Succinonitrile
***BN = Butyronitrile

4. Test for Battery Performance

Each battery obtained from Example 3 and Comparative Examples 4 and 5 was stored at a high temperature of 80° C. for 10 days and tested for battery performance. The test results are shown in the following table 2. Example 3 comprising the non-aqueous electrolyte containing fluoroethylene carbonate and succinonitrile added thereto according to the present invention, showed excellent capacity restorability and battery performance even after a high-temperature storage.

TABLE 2

|  | Example 3 | Comparative Example 4 | Comparative Example 5 |
|---|---|---|---|
| Electrolyte composition (%) | EC:EMC = 1:2 FEC 5 wt %, SN 2 wt % | EC:EMC = 1:2 | EC:EMC = 1:2, FEC 5 wt % |
| efficiency after storage at 80° C. for 10 days | 85% or more | 56%-57% | pouch swelling and venting due to gas generation |

As can be seen from the foregoing, according to the present invention, when the compound of Formula 1 and the aliphatic di-nitrile compound are used in combination, they can show a synergic effect in terms of securing safety at over-charged condition or in case of a high-temperature storage, and also can provide excellent battery performance.

Although the preferred embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An electrochemical device comprising: an anode and a cathode having a complex formed between a surface of a cathode active material and 1 wt % to less than 3 wt % of an aliphatic di-nitrile compound based on the weight of a non-aqueous electrolyte; the non-aqueous electrolyte containing an aliphatic mono-nitrile compound, 1 wt % to 10 wt % of fluoroethylene carbonate based on the weight of the non-aqueous electrolyte, a lithium salt and a solvent containing at least one cyclic carbonate selected from the group consisting of ethylene carbonate (EC) and propylene carbonate (PC), wherein the aliphatic di-nitrile compound is represented by Formula 2:

N≡C—R—C≡N  [Formula 2]

wherein R is $(CH_2)_n$ (n is an integer of 2-12).

2. The electrochemical device of claim 1, wherein the aliphatic di-nitrile compound is succinonitrile.

3. The electrochemical device of claim 1, wherein the solvent further comprises at least one linear carbonate selected from the group consisting of diethyl carbonate (DEC), dimethyl carbonate (DMC), ethyl methyl carbonate (EMC) and methyl propyl carbonate (MPC).

4. The electrochemical device of claim 1, wherein the complex is formed either by high-temperature treating the electrochemical device manufactured from an electrolyte containing the aliphatic di-nitrile compound added thereto, or by dipping the cathode, comprising the cathode active material coated on a collector, into the electrolyte containing the aliphatic di-nitrile compound added thereto, followed by heat treatment at high temperature.

5. The electrochemical device of claim 4, wherein the high-temperature treatment is performed at a temperature of 30° C. to 180° C. before or after assemblage of the electrochemical device.

6. The electrochemical device of claim 1, wherein the complex is formed by the aliphatic di-nitrile compound bonding with a transition metal in the cathode active material.

7. The electrochemical device of claim 6, wherein the aliphatic di-nitrile compound is succinonitrile.

8. The electrochemical device of claim 6, wherein the solvent further comprises at least one linear carbonate selected from the group consisting of diethyl carbonate (DEC), dimethyl carbonate (DMC), ethyl methyl carbonate (EMC) and methyl propyl carbonate (MPC).

9. The electrochemical device of claim 1, wherein the amount of the dinitrile compound is from 1 wt % to 2 wt %.

10. The electrochemical device of claim 9, wherein the complex is formed by the aliphatic di-nitrile compound bonding with a transition metal in the cathode active material.

11. The electrochemical device of claim 10, wherein the aliphatic di-nitrile compound is succinonitrile.

12. The electrochemical device of claim 10, wherein the solvent further comprises at least one linear carbonate selected from the group consisting of diethyl carbonate (DEC), dimethyl carbonate (DMC), ethyl methyl carbonate (EMC) and methyl propyl carbonate (MPC).

* * * * *